Aug. 9, 1932.   W. G. MAYER   1,870,418
SHOCK INSULATED TRUCK BODY
Filed July 13, 1928   2 Sheets-Sheet 2
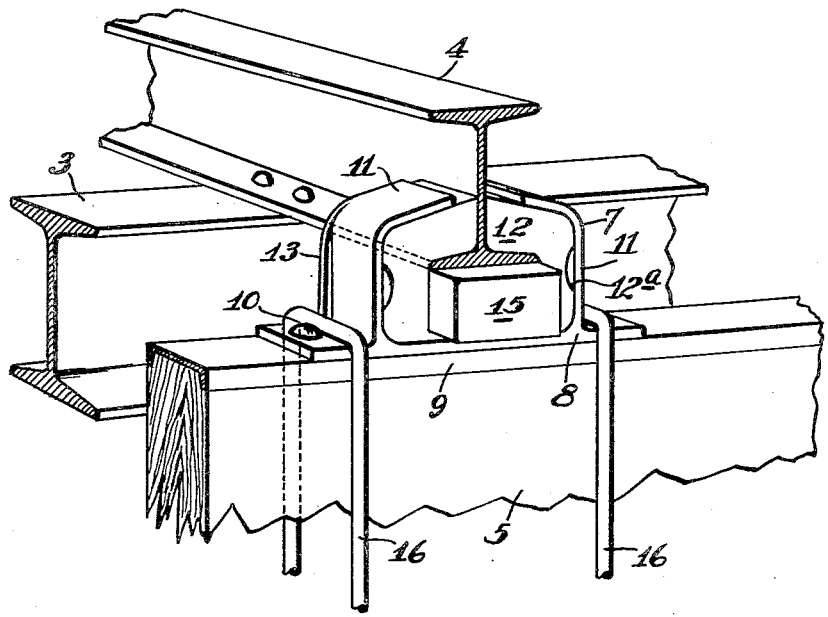
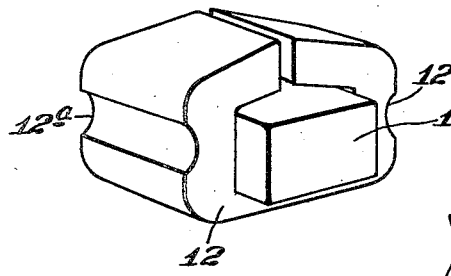
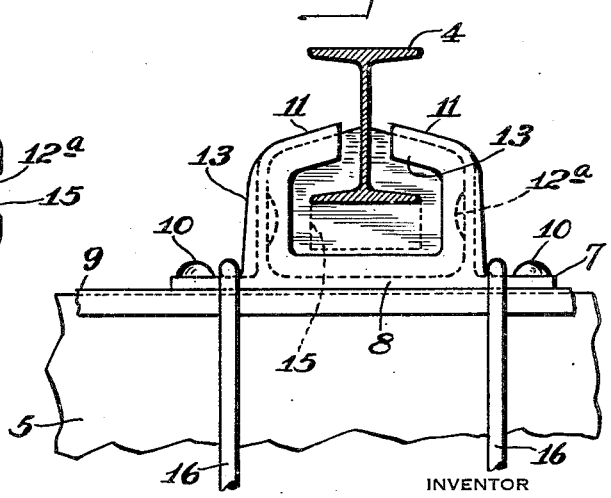
WITNESSES
A. B. Wallace
Jo. Baily Brown
INVENTOR
William G. Mayer
by Brown & Critchlow
his attys Patented Aug. 9, 1932

1,870,418

UNITED STATES PATENT OFFICE

WILLIAM G. MAYER, OF PITTSBURGH, PENNSYLVANIA

SHOCK INSULATED TRUCK BODY

Application filed July 13, 1928. Serial No. 292,473.

The invention relates to means for shock-insulating vehicle bodies above their supporting chassis.

An object of the invention is to provide a vehicle structure in which the body is supported by the chassis in such manner as to be additionally shock-insulated.

Another object is to provide a cushion support cooperating with the body of a vehicle and the chassis members which sustain it, which support eliminates direct bearing contact between those elements and reduces the shocks incident to operation of the vehicle.

A further object is to provide a cushioning support for connecting a rigidly constructed body frame to its chassis frame, which acts to distribute the stress of a non-uniformly disposed load over the entire body structure.

It is a special object to provide means for accomplishing the foregoing objects, especially adapted for use with vehicle structures comprising bodies built from structural section.

Figure 1:
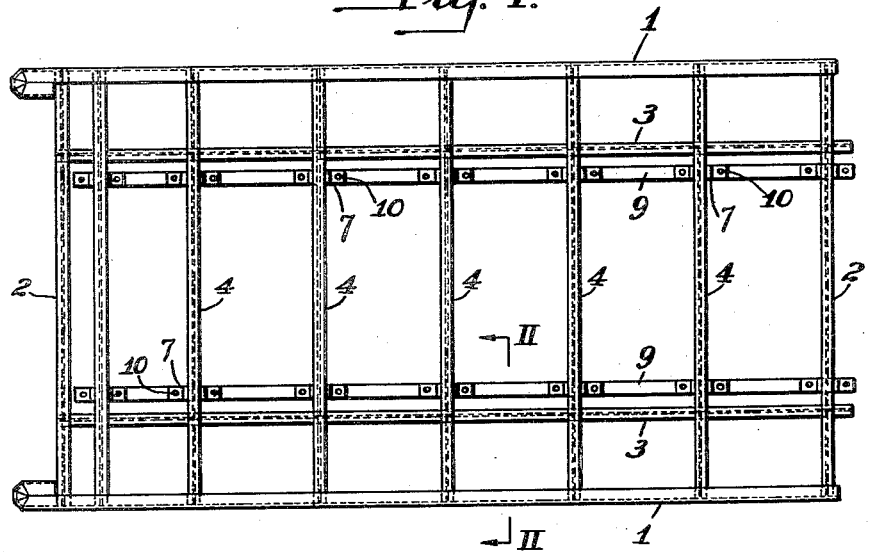
Figure 2:
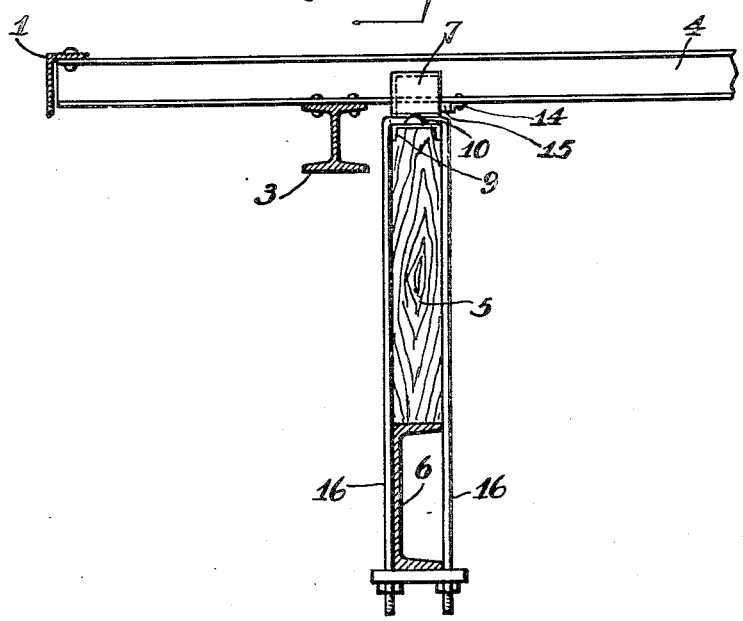

The preferred embodiment of the invention is illustrated in the accompanying drawings, in which Fig. 1 is a plan view of a partially constructed body embodying the invention; Fig. 2 is a sectional view, taken on line II—II, Fig. 1, showing also the manner of securing the body to the chassis; Fig. 3 is an enlarged partial section and perspective view of one of the cushioning supports shown in Fig. 1; Fig. 4 is a rear elevation of a connecting member as it appears in use; and Fig. 5 is a perspective view of a cushioning block.

Although the invention is applicable to various types of vehicles, it is especially adapted to truck construction. Fig. 1 shows by way of illustration, the application of the invention to a truck, the construction illustrated showing only those parts of the frame necessary for description and understanding of the invention.

As heretofore constructed, the body frame is usually connected directly to the chassis, in the manner well known in the art. Dependence for cushioning is therefore on springs beneath the chassis frame supports. This type of construction gives direct contact of body and chassis members at the bearing points, which causes shocks from the chassis frame to be transmitted directly to the body and its contents. Such connections are substantially inflexible, and as a result the bodies, which are not constructed to withstand much weaving or twisting are subjected to severe and damaging strains. Such joints may also cause squeaking. Rubber cushions between body and frame have been used, but not arranged as in my improvement. My invention comprises the use of a resilient connection between the body frame and chassis support, adapted to give positive connection and at the same time materially overcome some of the disadvantages inherent in prior cushioned structures.

The body shown comprises side and end members 1 and 2, longitudinal braces 3, and cross sills 4 disposed transversely of the longitudinal braces and preferably supported thereon. The cross sills are preferably constituted by I-beams, as seen in Fig. 2. Likewise, the other members may be, and preferably are, structural sections, such as channels, angles, I-beams, and the like. All of these members are joined in any suitable manner to form a rigid unitary structure.

According to the invention, the body is supported on the chassis by means of cushion supporting connections bearing the body members and carried on the customary wooden filler 5 borne by a channel 6, constituting one of the chassis frame members. The body member extends through the support and is entirely separated therefrom and from the adjacent filler by a shock-absorbing block, preferably of a special rubber composition. This connection is preferably made to the cross sills, which thus support the entire body on the fillers. The chassis construction forms no part of the invention, and being familiar to those skilled in the art, is omitted for simplicity in representation of the invention.

The support preferably comprises a housing bracket 7, having a base portion 8 connected preferably to a light channel 9 disposed on the wood filler, as seen in Figs. 2 and 3. The base of the bracket may be connected to the channel 9 by bolts or rivets 10 as shown in Fig. 2 or in other appropriate manner.

Rising from the base of the bracket are spaced opposed arms 11, arched toward each other to form an opening therebetween. The extended ends of the arms do not meet, but leave a restricted passage between their ends. A resilient cushioning block 12, Fig. 5, is disposed within the space between these arms, and a flange 13, formed on one side of each arm projects inwardly to partially close the opening, as shown in Fig. 4, to prevent the block from slipping out on that side.

The cushioning block is of any suitable resilient material, preferably rubber. In its preferred form this block has a base portion and sides formed to provide an opening corresponding to the cross section of the body member which it is to engage and support, in this case an I-beam. This construction will be understood from Figs. 3 to 5. The block is made of such size that it will neatly fit inside the support but it will not be held under any material compression, although it will firmly engage the member to be supported therein on all sides. Its inner end when in final position contacts with the terminal flange 13 or end of the clamp 7, so that movement of the block 12 is limited in forward direction by the clamp.

The cushioning block is preferably shaped to permit the rubber to flow somewhat inside the housing under load or impact. To this end longitudinal recesses or grooves 12a are preferably provided in the side, as seen in Fig. 5. These grooves provide spaces between the block and arms 11, into which the rubber may flow to take care of temporary compression caused by impact or load.

The connection is used as follows: Clamp 7 is connected to channel 9 and the cross sill is disposed therethrough, as seen in Figs. 1 to 4, and temporarily supported in position. By spreading the sides of cushion block 12, the latter is positioned on the cross sill and then forced between the bracket arms to abut against the inner terminal flange 13. In this position the block surrounds the lower flange and a vertical portion of the web of the I-beam cross sill 4, and separates it from the base of the clamp.

After the block has been moved into position against rear flange 13 a retaining lug 14 is fastened to the lower flange of cross sill 4, on the side opposite rear flanges 13, abutting and holding the block in its supporting bracket. This is shown in Fig. 2. For this purpose the block is most suitably provided with a nose or pad 15 which projects from the face of the block and is engaged by the bracket 14. This construction eliminates the possibility of squeaking by contact of lug 14 and channel 9.

The resilient connections are used at an appropriate number of points, to support the body, and preferably at each point where the cross sills and chassis-connecting members intercross.

The body is connected to the chassis by fitting channels 9 to the upper edges of fillers 5, suitably coped. U-bolts 16 are then passed over the sides of clamp base 8 and bolted under chassis channel 6, as shown in Fig. 2, thus firmly securing body and chassis.

The body is thus firmly connected to the chassis and shock-insulated therefrom. The cross sills pass entirely through the supports and blocks, and movement of the sills in the blocks is restrained by the grip of the rubber on the cross sill. The frame shown is of very rigid and sturdy construction, and by virtue of the connection to or support of the cross sills on the side members, longitudinal braces, and chassis fillers, three-way support for the cross sills is provided.

This connection can be varied to suit conditions. The clamp may be but is not necessarily a casting, and need not be precisely as shown and described. The vehicle constructed in accordance with the invention possesses advantages not present in those in which the body is mechanically connected directly to the chassis. Shocks incident to use are absorbed or diminished by the cushioning blocks. The body and chassis frame can move relative to each other, permitting the former to weave. The diminution in shocks and jars and relative movement relieve body strains and reduce damage thereto, as well as making it possible to carry delicate or easily damaged loads more readily.

A particular feature of the invention resides in the ability of the cushion clamping means not only to absorb shock, but also to distribute loads over the entire body. Thus in the usual constructions, the full stress of a load is applied to the members on which it rests, and the rest of the body bears substantially none of the load. In the case of heavy, non-uniformly disposed loads, the resultant strain may weaken or damage the structure. In a vehicle constructed according to the invention, these excessive strains are eliminated. For example, if a heavy load is placed at one end of the body, the strain will be applied to the entire structure, and each support will bear a portion thereof. This results from the supporting of the body in rubber blocks to be entirely separated from the non-resilient supporting members. In other words, the invention provides a type of floating support for the body. This action of the support reduces the danger of body damage from the source mentioned.

I claim:

1. A vehicle structure comprising in combination longitudinally disposed structural section chassis members, a rigid body including I-beam cross sills supported thereby and connected thereto, and cushioning connections between said chassis members and I-beams at crossing points, each of said connections comprising a bracket having a base connected to said chassis member, opposed arms arched inwardly to leave a restricted opening between the ends thereof through which said sills extend, and flanges formed on one end of said arms, a cushioning block provided with an aperture for receiving said sill aligned with said opening retained within said bracket by said arms and restrained from longitudinal movement in one direction by said flanges, said block enclosing and frictionally engaging the flange and web of said enclosed sill and entirely separating it from the bracket and chassis member, and a separate bracket connected to said I-beam on the side opposite said flanges to restrain longitudinal movement of the block in the other direction, said brackets and blocks connecting the chassis and body frame and forming a resilient support for said body frame permitting distribution of non-uniformly distributed loads throughout said cushioning blocks.

2. In a vehicle structure, the combination of a body frame formed of structural section sides and ends and structural section cross brace and longitudinal brace members interconnected to form a rigid structure, a chassis frame including structural section longitudinal members supporting said body frame, and cushioning means connecting said chassis and body frames, said means comprising a plurality of housing brackets having a base portion rigidly connected to said members of one of said frames and also having a cushion housing portion enclosing a vertical portion of the adjacent structural section member of the other of said frames, and a rubber cushioning block retainably positioned in said housing, said cushioning block frictionally engaging and wholly separating said enclosed member from said bracket, said means being arranged to provide a full floating support wholly cushioning the body frame from the chassis frame, and cooperating with said rigid body frame construction to distribute unevenly applied loads over the entire body frame.

3. In a vehicle structure, a body frame including structural section sides and ends and structural section cross brace and longitudinal brace members all rigidly interconnected to provide a rigid structure, a chassis frame including structural section longitudinal members supporting said body frame, and cushioning means connecting said body cross brace and chassis members, each of said means comprising a bracket having a base rigidly connected to one of said members and having a cushion housing portion enclosing a vertical portion of the other of said connected members, and a rubber cushioning block retainably fitted in said housing frictionally engaging the enclosed member and wholly separating it from the bracket, said means connecting said frames and providing a full floating support wholly cushioning and separating the body frame from the chassis frame, and cooperating with said rigid body frame construction to distribute unevenly applied loads over the entire body frame.

4. In a vehicle structure, a body frame including structural section sides and ends and structural section cross brace and longitudinal brace members all rigidly interconnected to provide a rigid structure, a chassis frame including structural section longitudinal members supporting said body frame, and cushioning means connecting said cross brace and chassis members, each of said means comprising a one-piece bracket having a base and opposed arms arched from the base toward each other to form a restricted passage between their adjacent ends, said brackets being arranged longitudinally of and rigidly connected to said chassis members with said arms enclosing a vertical portion of the adjacent cross brace member, and a rubber cushioning block shaped to flow in the bracket under load or impact retained between said arms and surrounding said enclosed member and wholly separating it from the bracket, said enclosed cross brace member being frictionally engaged by said block, said means connecting said frames to provide a full floating support for the body frame wholly separating it from the chassis frame, and cooperating with said rigid body construction to distribute unevenly applied load over the entire body frame.

In testimony whereof, I sign my name.

WILLIAM G. MAYER.